United States Patent
August et al.

[11] Patent Number: 6,125,172
[45] Date of Patent: Sep. 26, 2000

[54] APPARATUS AND METHOD FOR INITIATING A TRANSACTION HAVING ACOUSTIC DATA RECEIVER THAT FILTERS HUMAN VOICE

[75] Inventors: Katherine G. August, Matawan; Theodore Sizer, II, Little Silver; Gregory Alan Wright, Cliffwood Beach, all of N.J.

[73] Assignee: Lucent Technologies, Inc., Murray Hill, N.J.

[21] Appl. No.: 08/844,047

[22] Filed: Apr. 18, 1997

[51] Int. Cl.[7] .................................................. H04M 11/00
[52] U.S. Cl. .............................. 379/110.01; 379/90.01; 379/93.12; 348/13; 348/473
[58] Field of Search .............................. 348/13, 12, 473, 348/484, 460; 379/93.12, 90.01, 93.37, 102.01, 102.02, 102.03, 102.07; 381/161, 98; 455/420, 45

[56] References Cited

U.S. PATENT DOCUMENTS

| | | | |
|---|---|---|---|
| 4,079,419 | 3/1978 | Siegle et al. | 348/484 |
| 4,310,854 | 1/1982 | Baer | 348/484 |
| 4,425,642 | 1/1984 | Moses | 370/76 |
| 4,425,661 | 1/1984 | Moses | 375/1 |
| 4,629,833 | 12/1986 | Kern et al. | 381/98 |
| 4,807,031 | 2/1989 | Broughton | 358/142 |
| 4,894,789 | 1/1990 | Yee | 364/521 |
| 5,121,476 | 6/1992 | Yee | 395/154 |
| 5,138,649 | 8/1992 | Krisbergh et al. | 455/420 |
| 5,212,551 | 5/1993 | Conanan | 348/484 |
| 5,243,423 | 9/1993 | DeJean | 358/142 |
| 5,410,361 | 4/1995 | Goldstein | 379/102.07 |
| 5,490,168 | 2/1996 | Phillips | 375/224 |
| 5,570,295 | 10/1996 | Isenberg | 364/514 R |
| 5,579,124 | 11/1996 | Aijala | 386/96 |
| 5,579,537 | 11/1996 | Takahisa | 455/45 |
| 5,663,766 | 9/1997 | Sizer | 348/473 |
| 5,671,267 | 9/1997 | August et al. | 379/102.03 |
| 5,737,026 | 4/1998 | Lu | 348/460 |
| 5,761,606 | 6/1998 | Wolzien | 455/6.2 |
| 5,764,763 | 6/1998 | Jensen | 380/6 |
| 5,802,467 | 9/1998 | Salazar et al. | 455/420 |
| 5,844,984 | 12/1998 | Yamaguchi et al. | 381/380 |

*Primary Examiner*—Stella Woo
*Attorney, Agent, or Firm*—Morgan & Finnegan, L.L.P.

[57] ABSTRACT

In accordance with the present invention, an apparatus initiates a transaction and includes an acoustic data receiver, and microphone for receiving an audio signal having encoded data that is non-discernable by a listener and is transmitted as part of the audio signal. The microphone converts the sound waves into an electrical signal. A processor receives the electrical signal and retrieves transaction data that is part of the encoded data. A filter is associated with the microphone and removes a substantial portion of a human voice signal that may have been received within the microphone. Once the transaction data is retrieved, a telephone call can be originated and at least a portion of the transaction data can be transferred to a desired destination for initiating a transaction.

37 Claims, 6 Drawing Sheets

APPARATUS AND METHOD FOR INITIATING A TRANSACTION HAVING ACOUSTIC DATA RECEIVER THAT FILTERS HUMAN VOICE

FIELD OF THE INVENTION

This patent application is related to an apparatus and method for initiating a transaction using an acoustic data receiver that filters the human voice.

BACKGROUND OF THE INVENTION

In copending and commonly assigned patent application filed by K. G. August et al. and entitled System And Method For Wireless Capture Of Encoded Data Transmitted With A Television, Video Or Audio Signal And Subsequent Initiation Of A Transaction Using Such Data, a portable capture device is used to capture in a wireless manner encoded non-perceptible data from a light emitting device such as a television or other video or audio output device. The capture device uses the captured data to initiate a transaction, such as placing a telephone call and transmitting a message to a remote agent or automated attendant, and delivering the data to a point-of-sale agent directly or indirectly via a telecommunication connection.

This data is part of the ordinary program displayed by the device and yet indiscernible by a viewer or listener. As an example, a television monitor may be located in a kiosk or other public area, and display the advertising of selected services and products. The indiscernible data may be information needed to order those services or products, including prices, delivery intervals, shipping details, coupon offers, and other related information.

Capture can be effected by decoding subliminally modulated video broadcast signals, in a manner suggested in U.S. Pat. No. 4,807,031, issued on Feb. 21, 1989, to R. S. Broughton, et al., the teachings which are incorporated herein by reference in their entirety. Encoding, transmission and decoding of non-discernable data may be accomplished as described in patent application entitled "System and Method for Encoding Digital Information in Television Signal" filed on behalf of T. Sizer, and assigned to the same assignee as the present application, which copending application is incorporated herein by reference. Alternatively, a modulated carrier, which, for example, can be an amplitude shift keyed (ASK) or frequency shift keyed (FSK) signal having its primary frequency components at a frequency (e.g. 25 kHz) not usually present in a conventional television signal, can be added only to the luminance component of a television signal, and the data can thereafter be captured using bandpass filtering and an ASK or FSK receiver. The device includes a memory for storing the data for later use, and communications circuitry to output at least portions of the data (or data derived from the captured data) to a remote agent or device, such as via a telephone call or a data transfer to a point of sale device.

The encoded non-perceptible data can include associated dialing, routing, or other identification information, so that other portions of the captured data can be transmitted to an appropriate final destination or device. In this context, the final destination can be (a) a remote location, such as a platform arranged to process and consummate transactions, or (b) a point of sale system or other device (e.g., TV, stereo, VCR Plus, smart mouse device, etc.). The other portions of the captured data are part of the payload to be communicated to the final destination or device, and can include product or coupon information that is related to the display from which the non-perceptible data was captured, as well as programming or control data.

The capture device can include a built-in-display, such as an LCD display, and the encoded non-perceptible data can include display information, so that at least portions of the captured data can be discerned by a user of the device, and the user can thus be kept informed as to the operation of the device. The memory and the communications circuitry in the capture device are advantageously arranged so that, in a transaction initiated by the device using captured information, a two-way dialog may be initiated between the user and an agent at a remote terminal or a POTS system, and information may be transmitted to and stored in the device for later retrieval.

In U.S. Pat. No. 5,570,295, issued Oct. 29, 1996, entitled "System and Method of Capturing Encoded Data Transmitted Over a Communications Network in a Video System" filed on behalf of Isenberg and Tuomenoksa and hereby incorporated by reference in its entirety, non-perceptible information can be encoded in a television program, captured in a "set top box", and thereafter used to make telephone calls. The set top box is an electrical device that is "hard-wired" directly in the circuit between the video services network and the television set (as a stand alone unit or alternatively as part of the television set itself) and thus, unfortunately, is not portable. Also, the set top box is dedicated to one particular television (or other video source) and thus cannot be shared among several sources. Finally, the user of the set top box may be uncertain as to the nature of the information captured therein.

The above disclosures provide a system and method for initiating a transaction using the wireless capture of information obtained from a video/audio device, and for benefit of this invention, more particularly from an audio device such as a radio in a car or home premises. The wireless capture device acts as an acoustic data link where encoded data is transmitted from a source to the wireless capture device using sound waves. The wireless capture device includes an acoustic data receiver having a microphone for capturing the sound waves. However, a sensitive microphone used with the wireless capture device can be used for unauthorized purposes, such as listening to human conversations or detecting the audio channel of television, video or radio programs that may occur adjacent the acoustic data receiver. Most importantly, if someone uses the acoustic data link signal as a method of eavesdropping on anothers's voice or conversation, then a person's privacy is compromised.

SUMMARY OF THE INVENTION

The present invention now allows an acoustic data receiver to be used in the presence of other human voices without compromising ones right to privacy. In accordance with the present invention, an acoustic data receiver has a microphone for receiving an audio signal that has encoded data that is non-discernable by a listener, but is transmitted as part of the audio signal. The microphone converts the sound waves into an electrical signal. A signal receiver receives the electrical signal and works on the signal for further processing or data communication. A filter is associated with the microphone and removes those frequencies associated with a substantial portion of a human voice signal that may have been received within the microphone.

Typically, the signal receiver has a processing unit that receives the electrical signal. When the acoustic data receiver is part of a wireless capture device, any transaction data that is encoded within the audio signal is removed and processed. A telephone call typically is originated from a telephone number received from the transaction data and at least a portion of the transaction data is transferred to a desired destination for initiating a transaction.

In one aspect of the present invention, the filter comprises an electrical filter located after the microphone for filtering out signal frequencies corresponding substantially to those frequencies of the human voice. The acoustic data receiver typically can be a high-pass filter that passes frequencies above about 6,000–7,000 Hertz. The encoded data is part of a signal having a frequency typically above about 6,000–7,000 Hertz.

In still another aspect of the present invention, the filter can be a mechanical filter formed from an extensible tube having a diaphragm at one end. The microphone is located at the other end and a stub is in the middle of the tube. As the tube is lengthened, the frequencies that can be filtered by the filter are changed. This mechanical filter typically is contained in a sound enclosure.

When the acoustic data receiver is an integral part of a wireless capture device, a storage devices can store the transaction data, while a display, such as an LCD screen, can display at least a portion of the transaction data to a user. The transaction data also can include dialing information for originating a telephone call. The transaction data can also include descriptive information about an advertisement or solicitation that is associated with the audio signal. The capture device can include a portable phone. Means for originating a telephone call can be contained in a personal base station. Transaction data is transferred to the portable base station, which processes the data and originates a telephone call.

DESCRIPTION OF THE DRAWINGS

The present invention will be more fully appreciated by consideration of the following Detailed Description, which should be read in light of the accompanying drawings in which.

DETAILED DESCRIPTION OF THE INVENTION

Figure 1:
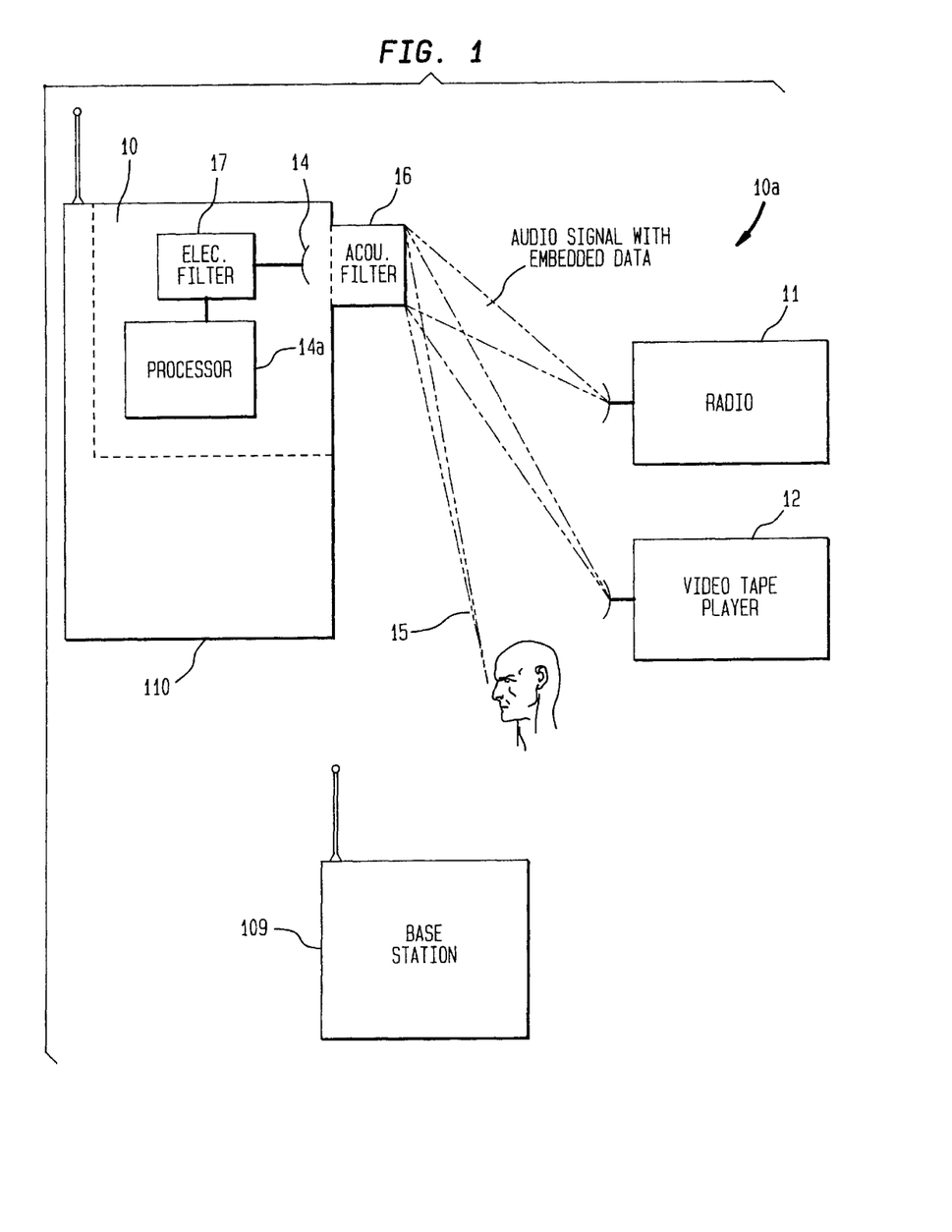
FIG. 1 is a schematic diagram of an acoustic data receiver that is part of a wireless capture device in accordance with the present invention.

Referring now to FIG. 1, there is shown a block diagram of an acoustic data receiver, indicated generally at 10, that is part of a wireless capture device, indicated generally at 110. As illustrated, the acoustic data receiver 10 prevents eavesdropping on human conversations in the vicinity of an acoustic data link formed between the receiver 10 and a source of an audio signal, indicated generally at 10a.

Figure 5:
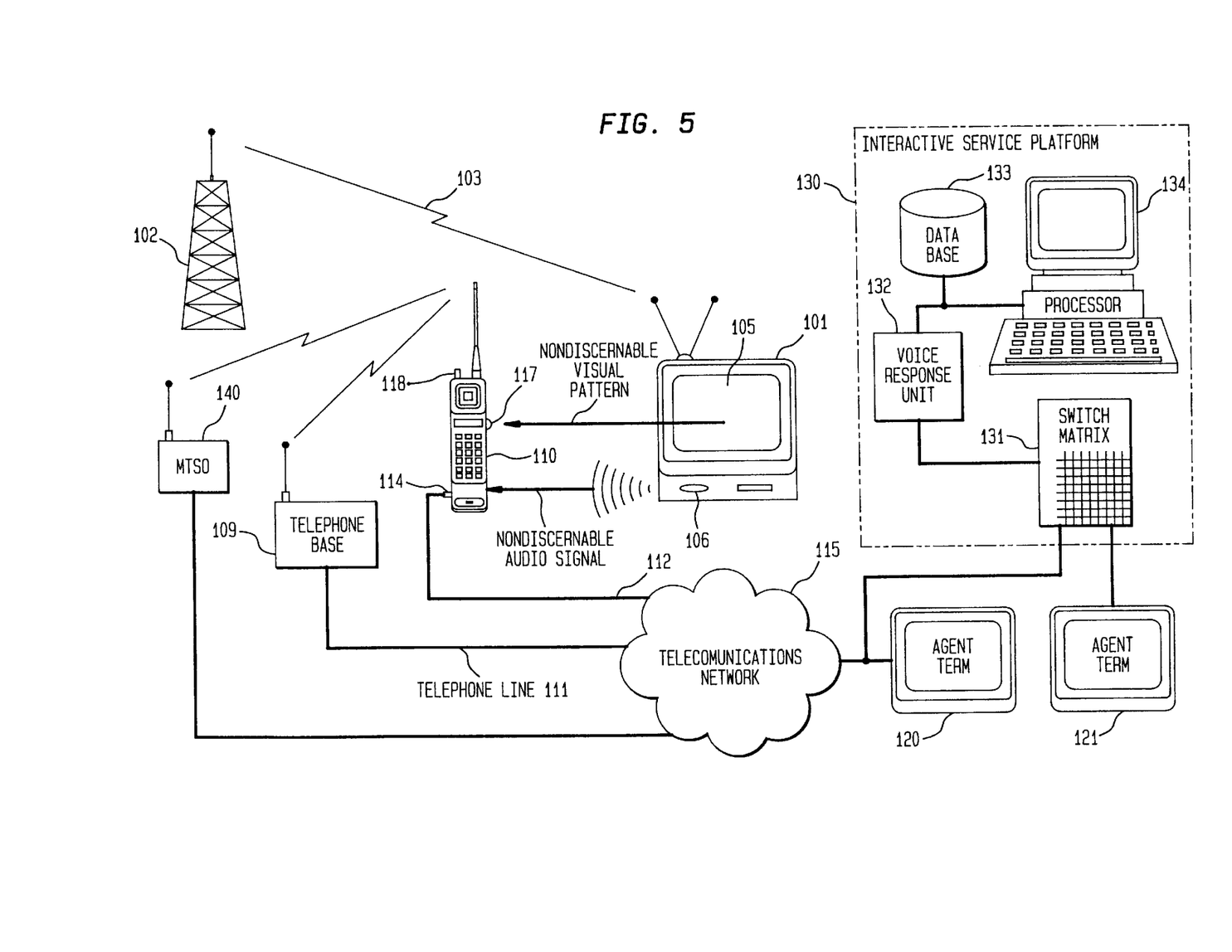
FIG. 5 is a schematic, drawing of one embodiment of a system arranged for wireless capture of encoded data.

An acoustic transmitter can be a separate device for transmitting an encoded information signal such as a sound wave. It can be a radio 11 or the audio channel of a television or video tape player 12 or other similar device that produces an audio signal capable of being suitably encoded with information such as transaction data. The wireless capture device 110 includes a microphone 14 in the receiver 10 which converts the sound wave into an electrical signal for further use through either a data transfer to a separate processor or data processing in a processor 14a contained in the wireless capture device. For example, the wireless capture device can receive the sound wave and convert it into an electrical signal and then transfer it to a portable base station 109 as shown in FIG. 5. Additionally, the wireless capture device 110 could be a cellular phone, such as used in an automobile, which would include appropriate processing apparatus for retrieving transaction data from the audio signal and then initiating a transaction by dialing a telephone number that could have been retrieved from the transaction data.

To prevent eavesdropping of any human voices 15 in the vicinity of the receiver 10 and prevent human voices from being reconstructed from electrical signal coming from the microphone 14 and receiver 10 of the wireless capture device, it is important that no information or data is stored or forwarded that could be used to reconstruct those human voices. Thus, it is essential to eliminate any possibility of unauthorized access to a signal that could be used to eavesdrop.

In accordance with the present invention, eavesdropping is eliminated by using either an acoustic filter 16 ahead of the microphone 14 or an electrical filter 17 after the microphone 14 to prevent voice signals from reaching the processor 14a, which is part of the wireless capture device.

Figure 2:
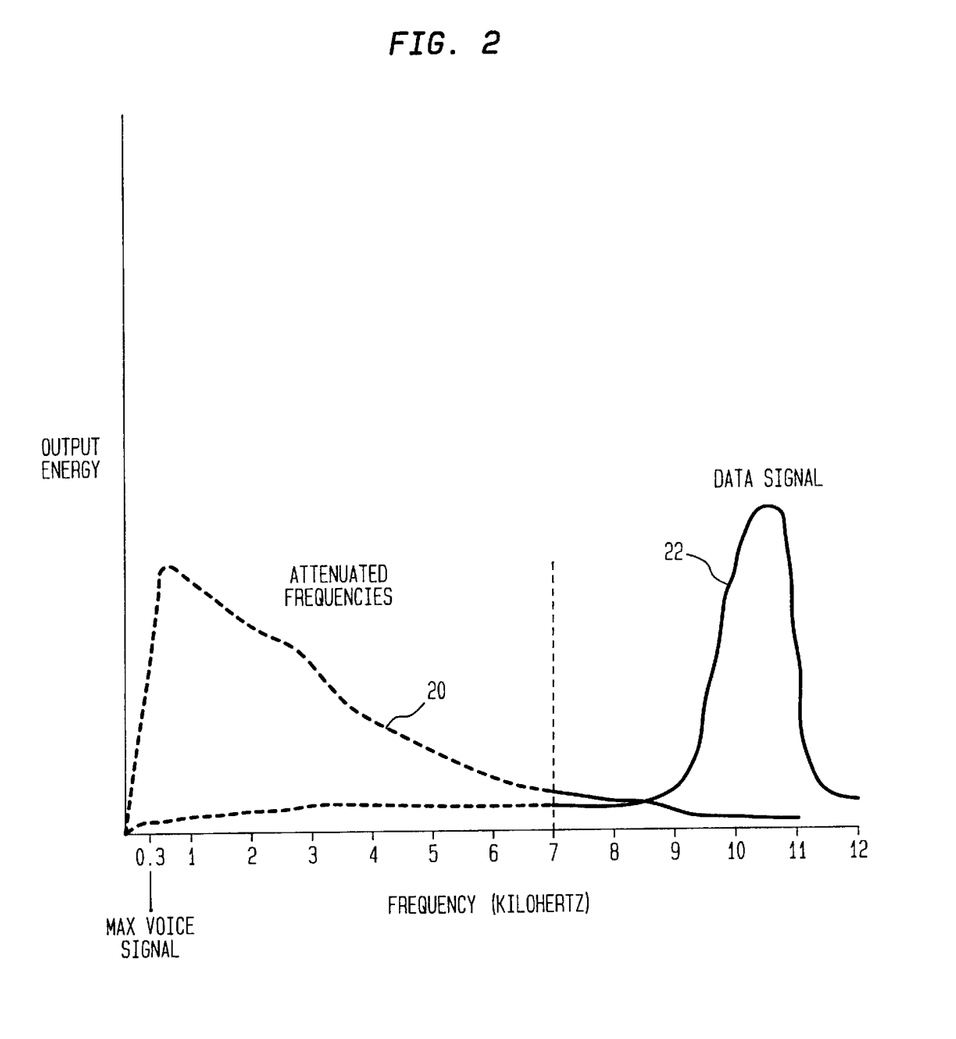
FIG. 2 is a schematic diagram of a sound wave curve illustrating how a high pass filter allows frequencies above about 7,000 Hertz.

As shown in the graph of FIG. 2, the acoustic frequencies occupied by the human voice are shown on the curve 20, and typically occupy the 100 Hertz (Hz) to 4,000 and 6,000 Hz range, with the maximum energy occurring about 300 Hz to about 2000 Hz. The output of an acoustic or electrical filter that can sufficiently attenuate the human voice frequencies to make them unintelligible would pass frequencies only above about 7,000 Hz. Thus, any signal passing such filter would not contain intelligible human voice signals. A filter response is shown on curve 22 on FIG. 2. Attenuate frequencies are shown by the dotted line.

Appropriately encoded data signals can still be unaffected by the filter. For example, the filter could normally pass frequencies above 7,000 Hz. If the data signal was at about 10,000 Hz, and occupied a sufficiently narrow bandwidth as shown by the graph of FIG. 2, then the data signal would not be significantly attenuated or distorted by the filter. Thus, the data signal would be substantially unaffected.

Figure 3:
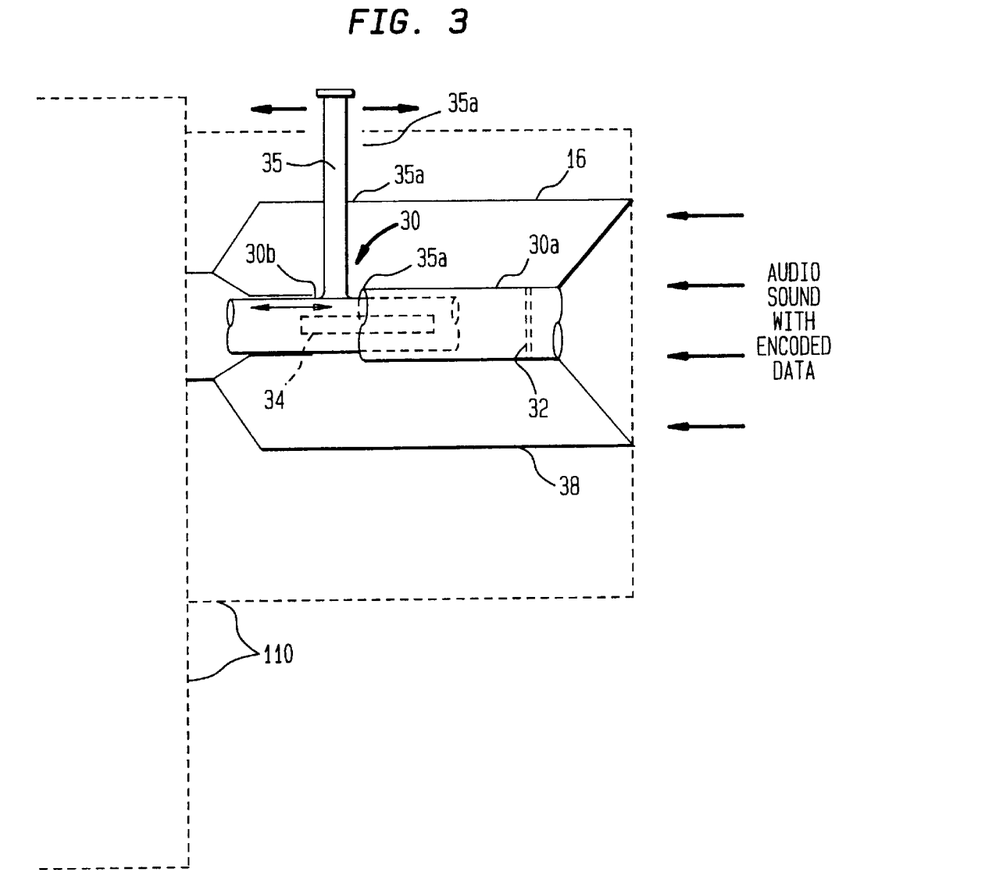
FIG. 3 is a schematic diagram of a mechanical filter and acoustic data receiver in accordance with the present invention.

Referring now to FIG. 3, there is illustrated at 16 an acoustic high pass filter that can be placed before the microphone 14 to exclude almost all the voice signal from reaching the microphone. This high pass filter 16 is constructed from a tube 30 having a diaphragm 32 at one end and the microphone 14 at the other end. A open stub 34 is placed at its mid portion. The tube 30 can be formed from two slidable sections 30a and 30b, so that it can be extended along its length by moving handle 35 which extends though associated slots 35a formed in the tubes 30a, 30b and capture device 110. The stub 34 is moveable also, by adjusting the length of the tube 30. The position and length of the stub 34 relative to the tub sections 30a, 30b changes the desired filtering characteristic of the filter 16. Other construction methods and types of filters are known to those skilled in the art.

This filter 30 is mounted in a sound absorbing enclosure 38, which prevents sound from reaching the microphone 14 unless the sound passes through the filter. In this embodiment, only those sounds at frequencies higher than those needed for intelligible human speech reach the microphone 14. As a result, human speech cannot be reconstructed from the electrical signal coming from the microphone 14. A person with access to the electrical signal from the microphone, such as through data transfer or by processing apparatus connected to the microphone would not be able to reconstruct human speech signals that might be present in the vicinity of the acoustic data receiver 10.

Figure 4:
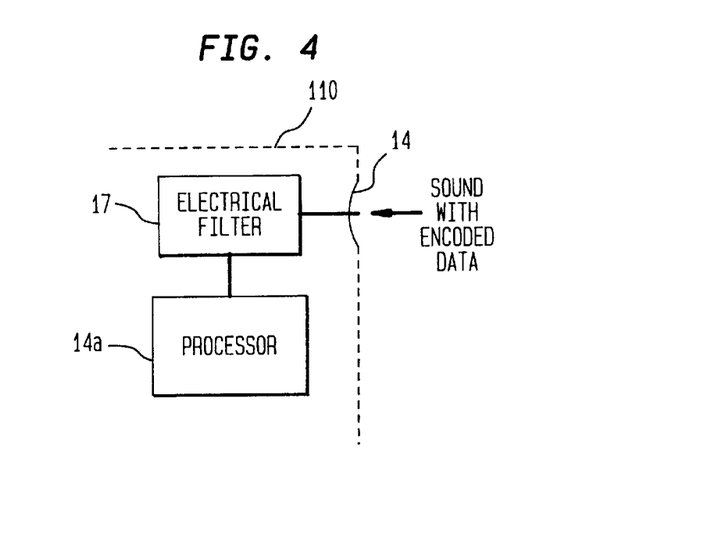
FIG. 4 illustrates a schematic diagram of an electrical filter and acoustic data receiver in accordance with the present invention.

FIG. 4 illustrates another embodiment using an electrical filter 17 positioned after the microphone 14 to exclude almost all voice signals from reaching any data communication or processing apparatus that are part of the acoustic data reciever 10. The microphone 14 receives an audio sound signal and converts that sound signal into an electrical signal. The resulting electrical signal is passed through the filter 17 which removes those frequencies necessary to reconstruct human speech. The techniques used to build such an electrical filter are well known to those skilled in the art. The electrical output of the filter is connected to the processor 14a. Because the frequencies needed to reconstruct untelligible human speech are not present after the output of the filter 17, someone with access to the signal, such as communication or a processor apparatus, could not reconstruct human speech signals that might be present in or near the acoustic data link generatd between the source 10a and receiver 10.

There is now described in greater detail various ways in which transactions can be completed and data captured within the wireless capture device 110 of the present invention. The following description explains one type of apparatus, system, and method which could be used for the present invention. Others could be devised by those skilled in the art. The acoustic data 10 reciever of the present invention would be incorporated within the apparatus as described or work closely with that apparatus.

Referring first to FIG. 5, there is shown a schematic drawing of one embodiment of the present invention arranged for the wireless capture of encoded non-perceptible data from a light emitting device such as a television 101, and subsequent use of the captured date to initiate a transaction with a person at an agent terminal 120, or a person at another terminal 121 that is supported by an interactive service platform 130. Such data could be obtained also through scanner unit 50. However, for purposes of understanding, much of the following discussion will concern the retrieval of non-perceptible data from a light emitting device such as a television, or audio signal from a speaker.

A television signal is received by television 101 via over-the-air transmission, as from transmission tower 102 via a transmission link 103, or alternatively is supplied by a cable TV connection, or from a VCR/videotape. The video portion of the television signal is displayed on the picture tube or other visual display area 105 of a monitor, computer or a television 101, while the audio portion of the television signal is played from speaker 106. Associated with the program that is seen and possibly heard by a viewer/listener is non-discernible encoded data that is transmitted as part of the video and possibly audio signal. For example, the program may be an advertisement for a service or product, and the indiscernible data may create a subliminal visual pattern on the visual display area, that when properly received and decoded, contains information needed to order those services or products, including prices, delivery intervals, shipping details, coupon offers, and so-on.

Encoding, transmission and decoding of non-discernible data may be accomplished as described in a patent application entitled "System and Method for Encoding Digital Information in a Television Signal" filed on behalf of T. Sizer and assigned to the same assignee as the present application, which co-pending application is incorporated herein by reference. Briefly, it was found using a spectrum analyzer on a typical video signal, that there are comparatively large frequency components at the line rate and at the frame rate and its harmonics, but that between these frequencies, there are other frequency bands in which little information is carried. One such frequency band is between 15 and 30 kHz. By adding a low level carrier signal or tone at a frequency in this band, say 25 kHz, the video image is not degraded, but a properly tuned decoder can receive and decode the encoded information. In this way, digital information can be subliminally inserted in a video signal by adding to the video signal an amplitude shift keyed (ASK) or frequency shift keyed (FSK) carrier signal, and the digital information can later be recovered using ASK or FSK decoding. Encoded data can also be inserted in a television signal and recovered by a received that responds to the picture displayed on the television, in the manner described in U.S. Pat. No. 4,807,031 cited above.

Figure 6:
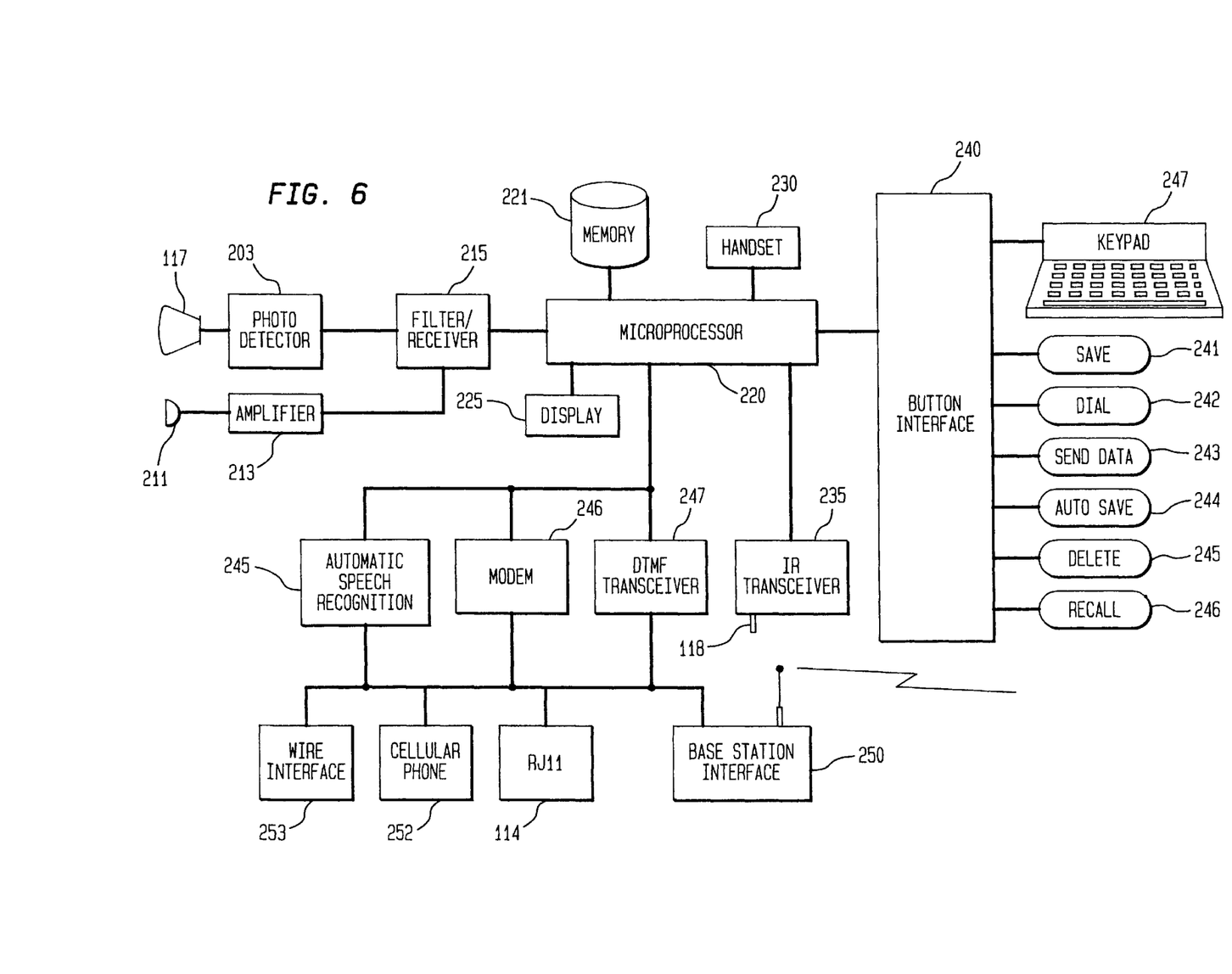
FIG. 6 is a block diagram illustrating the components of the capture device of FIG. 5.

The program displayed on television 101 is sensed by the portable capture device 110, which is described in more detail in connection with FIG. 6. When the non-discernible encoded data is part of the video signal, such sensing takes the form of light from display area 105 being collected by an optical lens 117. When the non-discernible encoded data is part of the audio signal, such sensing can take the form of sound from a speaker 106 that is collected by a microphone 211 (FIG. 6). In either event, there is a wireless communication of the information from television 101 to capture device 110 such that the encoded data is "viewed" or "heard" rather than transmitted through a wired connection, or through a more conventional radio frequency communication.

In addition to receiving non-discernible encoded data, the capture device 110 has the capability of (a) storing the encoded data, (b) transmitting (or otherwise outputting) the encoded data (or information retrieved using such data) to a remote location or device, and (c) displaying the encoded data to a user. The data may include information for initiating a transaction or originating a telephone call, as well as additional information (e.g., price and ordering information) associated with the television program being displayed on television 101. The remote location can be agent terminals 120 or 121, interactive service platform 130, or a point of sale system, and the communication between the capture device 110 and the remote location may be one-way or two-way.

In the case where encoded data is to be output from capture device 110 via a telephone call, the call may be initiated and transacted in one of several ways, as illustrated in FIG. 5. First, the data may be transmitted over a wireless link to an associated telephone base station 109 that is, in turn, connected to a telephone line 111 that is part of a telecommunications network 115. Communication between capture device 110 and base station 109 may be accomplished in a variety of ways; as an example, the same signaling and transmission can be used as is presently used in communication between a cordless telephone handset and its associated base station. Second, capture device 110 may be directly connected to a telephone line 112 through an interface that includes a standard telephone jack 114. Third, capture device 110 may include the functionality of a cellular telephone, so that the data may be communicated to a remote location via a wireless call placed to a mobile telephone switching office (MTSP) 140, which is in turn connected to telecommunications network 115.

As explained more fully in connection with FIG. 6, capture device 110 may include a dual tone multi-frequency (DTMF) transceiver arranged to generate a series of audible tones. Accordingly, a fourth way to initiate a telephone call would apply portions of the data to the transmitter (tone generator) portion of the DTMF transceiver. Capture device 110 may then be placed in juxtaposition with the microphone portion of a conventional telephone handset, such that the audible tones generated in capture device 110 are acoustically coupled through the handset to receivers in telecommunications network 115.

Capture device 110 can also output encoded data directly, without making a telephone call. This is useful in conjunction with a point of sale system or the like, which includes a docking station or other interface to which the capture device may be connected, or an IR receiving device or a device responding to DTMF.

If an outgoing telephone call in initiated by capture device 110, the call can illustratively be routed through telecommunications network 115 directly to an agent terminal 120, or to an interactive service platform 130, which is connected to another agent terminal 121. When a connection is completed to platform 130, the call may be routed by a switch matrix 131 to a voice response unit 132 that operates under the control of a processor 134. Information included in the captured encoded can be provided to the attendants, or processor 134 can perform a look-up and retrieval operation in database 131, using encoded data as a key, in order to effectuate a desired transaction.

For certain transactions, information connected with a transaction may also be transmitted from service platform 130 to capture device 110, either for display to a user, storage for later use, or output to a point of sale system or device. This information may, for example, be confirmation information, indicating that a transaction has been effected, or details regarding a just completed transaction, such as ticket information relating to a travel reservation.

Referring now to FIG. 6 there is shown a block diagram illustrating in more detail the components in one embodiment of capture device 110 of FIG. 5. If the encoded non-perceptible data is inserted in the video portion of a television signal, the images displayed on visual display area 105 are captured by optical lens 117 and an associated photo-detector 203, which is arranged to supply an electrical signal to a filter/receiver 215 representing the image.

On the other hand, if the encoded non-perceptible data is inserted in the audio portion of a television signal, the output from speaker 106 is captured by a microphone 211 and an associated amplifier 213, which is arranged to supply an electrical signal to filter/receiver 215 representing the sound energy. In either event, the encoded non-perceptible data is decoded in the filter/receiver 215 in a manner consistent with the manner in which the original data was encoded. Thus, filter/receiver 215 can be arranged to perform the same functionality as the elements illustrated in FIG. 4 of the above referenced Broughton et al. patent, or, alternatively, the operation of filter/receiver 215 can be as described in conjunction with FIG. 4 or 7 in the copending application of T. Sizer. In each instance, it is noted that the capture device 110 receives encoded data by "watching" or "listening to" the output of television 101 (or another similar display device), and that the capture device 110 is not connected to television 101 or the other display device by a cable or wires.

The output of filter/receiver 215, representing the data captured by capture device 110, is applied to a microprocessor 220, which is arranged to perform various data processing and control functions in coordination with programs stored in an associated memory 221 as well as inputs received from a user of capture device 110. Generally speaking, capture device 110 may operate in an active or a passive mode. In the active mode, capture device 100 responds only to user initiated capture commands. In the passive mode, capture device 110 captures all of the data sent to it while in that mode. In either mode, captured data may be routed by microprocessor to memory 221 and stored for use at a later time, as determined by the user. The captured data may also be displayed on a display 225, such as a liquid crystal display, so that a user will be aware of exactly what information was captured.

The control programs contained in memory 221 can implement numerous functions, which broadly speaking, can be categorized as (a) functions relating to data capture, such as SAVE and AUTOSAVE functions, (b) functions relating to output of already captured data, such as DIAL and SEND DATA functions, (c) functions relating to memory manipulation, such as the RECALL and DELETE functions. The above enumerated functions are initiated when respective buttons 241–246 are activated, and the activation signal output from a button is applied to microprocessor 220 via a button interface 240. Each of the functions is discussed below.

When the SAVE function is initiated by activation of button 241, the capture device 110 is in the active made, and the encoded data contained in the current audio or video output of television 101 is captured. This is accomplished, for example, by activating optical lens 117 and photo detector 203, or microphone 211 and amplifier 213, for a relatively brief period of time, typically on the order of several seconds, so that encoded data associated with the current program which is displayed on display area 105 or played through the loudspeaker 106, is processed by filter/receiver 215 and stored in memory 221. A visual or auditory cue may be contained in the video or audio program to indicate to a user of a capture device that there is data to be captured. When the SAVE function is activated, the microprocessor 220 may control display 225 to indicate the current status, e.g., that the capture device is in the process of receiving and capturing data. When the data has been captured, the microprocessor 220 may control the display 225 to actually display some or all of the data, so that the user can be aware of information that had been subliminal and indiscernible. The display can also indicate that the device is "aimed" correctly.

When the AUTOSAVE function in initiated by activation of button 244, capture device 110 is in the passive mode. In this mode, capture device 110 captures a series of encoded data that may be contained in each of a series of programs that can be viewed or heard on television 101. This can be accomplished, for example, by activating optical lens 117 and photo detector 203, or microphone 211 and amplifier 213, for a relatively long period of time, typically on the order of several minutes or hours. Encoded data captured from the various programs that are displayed on display area 105 or played through loudspeaker 106 over a long period of time are processed by filter/receiver 215 and stored in memory 221. As with the SAVE function, when the AUTOSAVE function is activated, microprocessor 220 may be arranged to control display 225 so as to indicate the current status, e.g., that the capture device is in the process of receiving and capturing data.

When a user of capture device 110 desires to use any of the data stored in memory 221, including data stored as a result of the AUTOSAVE function, the contents of the memory 221 may be retrieved and displayed on display 225 by initiating the RECALL function upon activating button 245. This permits a user to be aware of exactly what information was previously captured and stored. Through this function, the user will be able to selectively peruse or scroll through the stored data, so as to retain or use selected portions thereof. Activation of button 246 initiates the DELETE function, whereby portions of the data stored in memory 221 are selectively erased. In order to conserve and thereby "recycle" the storage capacity of memory 221, the microprocessor 220 may also be arranged to manage the contents in memory 221, so that the oldest information stored therein could be cycled out and deleted as new information is captured and stored.

Turning now to consideration of the use of already captured data, it is an important functionality of capture device 110 to permit such data to be output upon a command from a user. Such data, when output, can be used to (a) make a telephone call, and, when the call is answered, to provide information to a live or automated attendant that received the call, or (b) initiate a transaction, such as by interacting with a special purpose terminal or kiosk arranged to receive the stored data, or a device such as a VCR Plus or a stereo. In accordance with the arrangement shown in FIG. 6, data output via a telephone call can be initiated in several ways.

First, captured data can be routed by microprocessor 220 from memory 221 to a modem 246 and then to a base station interface 250, so that the information can be communicated to telephone base 109 of FIG. 5. This in turn allows a conventional telephone call to be originated from telephone base 109.

Second, captured data can be routed through modem 246 to a wire interface 253, which allows capture device 110 to be physically connected to a terminal or docking station for information off loading.

Third, captured data can be routed to a DTMF transceiver 247, which includes a tone generator arranged to output DTMF tones. These tones can be directly connected to a telephone line 112 via a standard connection such as RJ11 jack 114. Alternatively, capture device 110 can be placed in juxtaposition with the microphone in a telephone handset, and the audible tones can be applied and used much like an audible frequency autodialer.

Fourth, captured data can be routed through modem 246 to a cellular telephone 252, which can initiate a cellular call. When a cellular connection is completed, the captured data can be output in encoded form or an audible tones.

For each of the arrangements just described, a telephone call may be originated using the DIAL function. This function in initiated by activation of button 242. With this function, dialing information, which is part of the data captured by capture device 110 and now stored in memory 221, is retrieved. This information is then further processed, so that a telephone call can be initiated. In some instances, a call is originated by application of stored data to DTMF transcriber 247, so that audible tones can be output. In other instances, a data call can be initiated by appropriately formatting stored data. In yet other instances, such as when a cellular call is dialed, stored dialing information may be applied to an outgoing number register. The exact manner in which information is output from the capture device 110 can vary, in accordance with several embodiments of the present invention.

While the DIAL function is used to output certain captured information needed to initiate a telephone call (or other data output function), the SEND DATA function, initiated by activation of button 243, is used to output other portions of the captured data stored in memory 221, pertaining, for example, to a transaction that the user desires to make. This additional data is retrieved from memory 221 and appropriately transmitted, depending upon the manner and type of telephone call involved. Thus, data may be output either via base station interface 250 to telephone base 109, or via RJ11 jack 114 onto telephone line 112, or via cellular phone 252 to MTSO 140. Note that if output occurs directly, without a telephone call, the SEND DATA function may cause information from memory 221 to be output via wire interface 253. During the SEND DATA function, the information being output may also be displayed on display 225. This allows a person using the capture device to identify the information that was captured, and use the information in an actual transaction.

It is to be noted here that capture device 110 of FIG. 5 may optionally include an automatic speech recognition circuit 245, an infrared (IR) transmitter 235, a handset 230 and a keypad 247. The purpose of IR transmitter 235 is to allow captured data to be output directly to a device such as a point of sale system or a VCR or the like, via infrared transmission. The purpose of speech recognition circuit 245 is to convert captured data to spoken phrases, which can be played to a user or to an attendant after a telephone call is initiated. The purpose of handset 230 and keypad 247 is to allow capture device 110, in addition to being used in accordance with the present invention, to be used to complete conventional dialed telephone calls.

In one application of the present invention, a televised advertisement for a product includes additional ordering or "coupon" information embedded in a subliminal visual pattern within the video image displayed on visual display area 105. The coupon information describes the item(s) offered for sale, the regular price, the coupon value, and contains additional information needed for ordering. This embedded information is transmitted between television 101 and capture device 110 at a rate such as 60 bits per second, that is sufficient such that the necessary information can be transmitted in a very brief period of time. In the application just described, the embedded product information, dialing number, coupon information and necessary checkbits together comprise approximately 2,000 bits of information, so that between three and four seconds would be required for transmission. Once the coupon information is stored in capture device 110, the user of the capture device can supplement the coupon information with user entered data which can be entered using keypad 247. This supplemental information may include credit card or other billing information pertaining to the user, as an example.

Figure 7:
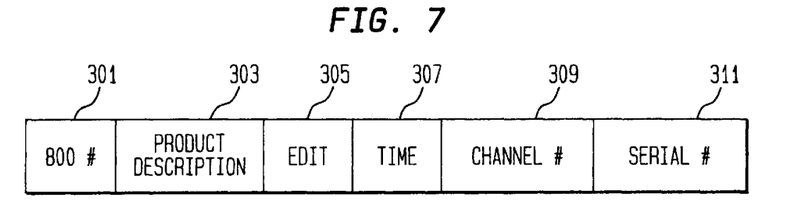
FIG. 7 is a diagram illustrating one example of the format of captured data.

As shown in FIG. 7, the information represented by the encoded data can be organized in several fields. Using the coupon application as an example, a first field 301 contains a telephone number which may be used to originate a telephone call in order to order the product to which the coupon applies. Illustratively, this will be a toll-free or "800" number. Other information associated with the coupon can include a product description in field 303, an expiration date in field 305, the time that the advertisement is televised in field 307, the number of television channel running the ad in field 309, and a serial number for the ad in field 311, identifying either or both the particular ad and its sequence in an ad campaign. It is to be noted that various other information can also be included in the information illustrated in FIG. 7, such as keywords or attributes describing the received encoded data, as well as information indicating that a product is available in particular colors or sizes. The keywords would be useful in retrieving from memory 221, information relating to specific products or advertisers.

Figure 8:
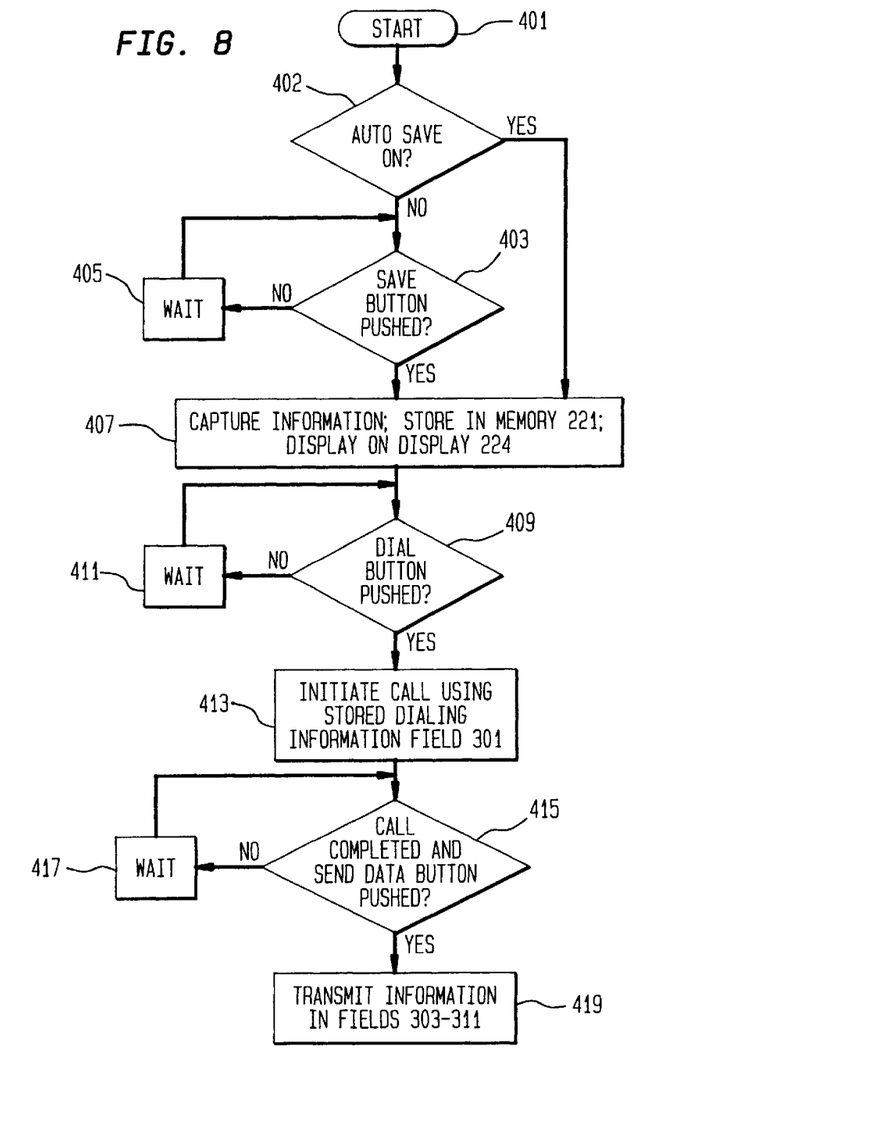
FIG. 8 is a flow diagram of the process by which data embedded in a subliminal visual or non-audible message is captured and used.

The process by which information embedded in a subliminal visual or audible message is captured and used is illustrated in flow diagram form in FIG. 8. As indicated previously, two general modes of operation are contemplated, namely a "passive" mode and an "active" mode, both of which follow a "start" step 401.

In the passive mode, a user desires to operate the capture device 110 in an unattended manner, and to capture all of the encoded data that may be subliminally displayed on a display device 105 or output from speaker 106 over a relatively long period of time, typically several minutes or hours, until the user, at some later time, desires to discontinue or terminate the capture. This mode is initiated using AUTOSAVE functionality, by activating button 244. When this is done, a positive response is obtained in step 502, so that data capture, storage and display, all as described below in connection with step 507, occur. While in the passive mode, capture is terminated by subsequent activation of the same button 224.

In the active mode, a user operates capture device 110 in real time, typically while viewing a video display or listening to an audio presentation. During the display or presentation, the user sees or hears a corresponding televised advertisement or other indication that imperceptible information is available for capture. The user may, at this time, be instructed to activate SAVE button 241, or the user may know, from previous experience, how to use the device. When button 241, or the user may know, from previous experience, how to use the device. When button 241 is activated, a positive result occurs in step 503, thereby capturing the imperceptible encoded data, displaying all or a portion of the data on display 225, and storing same in memory 221, all in step 507. Until the SAVE button is activated, capture device 110 may be in a "wait state" 505.

The user of capture device 110 determines that the appropriate data has been captured by reviewing the information seen in display 225. After the captured data has been reviewed and determined to be correct, activation of the DIAL button 242 on the portable capture device 110 in step 509 initiates step 513, by which stored dialing and/or routing information, illustratively in field 401 of FIG. 8, is recalled from memory 221. A call is then originated launch, such by transmitting the dialing information from memory 221 through base station interface 250 to base station 109 and thence to telephone line 111 and telecommunications network 115 to interactive service platform 130. The call may be a local or long distance call made using a "plain old telephone service" (POTS) line; alternatively, a toll-free call may be launched using an 800 number. Desirably, automatic number identification (ANI), called ID, and other features available in the telecommunications network may be used to provide additional information to the called party, in addition to the captured data that is transmitted in succeeding steps in the process. Until the DIAL button is activated, capture device 110 may be in a "wait state" 511.

After the call has been originated, a determination is made in step 515 that the call ban been answered and that the SEND DATA button 243 has been pushed. (Until the SEND DATA button is activated, capture device 110 may be in a "wait state" 517.). When a positive result occurs in step 515, information contained in fields 403–411 is transmitted to the called destination in step 519. As stated previously, from the point of view of the called party, the information received includes details concerning the advertised product, the identity of the caller, and other information associated with the item that was initially displayed or mentioned on the television program. Advantageously, the advertiser will know more about their customer that ever before. This is because the advertiser will be able to determine from the transmitted information which advertisement draw the business, how long it took the caller to respond to the ad, and the geographic location of the callers, based upon ANI or called ID. It will be easy to tell which ads in a campaign are most successful.

In accordance with one optional arrangement of the present invention, when data is captured and stored in step 507, they newly collected data is compared with previously stored data. When a match is found, any duplicate data is dropped. In addition, the information in various fields is examined, to assure that the data captured is in the appropriate format. If an error is detected in any data, the information may be deleted, and "new" data collected. This is accomplished by repeating capture step 507 several times.

In another application of the present invention, an interactive television capability is provided in connection with a game show or television drama. For a game show, an audience would be asked to vote on various aspects of the game. This could include questions such as which person should go on a date with the contestant, or which singer is the best? The audience would be instructed to press the "SAVE" button on their capture device at the appropriate time specified for their choice. The viewers vote would then be cast by depressing the DIAL button, communicating with the game show host, and then transmitting information indicating the vote by depressing the SEND DATA button. Alternately, one number could be transmitted and an automated interactive voice platform such as the InfoWorx™ platform available from AT&T could offer options to the caller. These calls could be toll free calls, or, alternatively, billed to the caller.

In yet another application of the present invention, a video on demand capability can be provided. A viewer sees a video he or she would like to see advertised on a previewing network. An instruction to press the DIAL button on the capture device is made on the previewing channel to indicate to the viewer that he or she can press the button to order a particular video. The call would be placed to a voice response system used to reserve the video on demand. Information about which video the called wanted to see is sent over the phone lines once the call is connected. The caller would merely have to acknowledge the order and select a time slot.

The present invention can also be employed in the context of programming of a VCR, particularly where the user already has the capabilities provided by VCR Plus, a product that is commercially available. In this embodiment, a code sequence associated with and representing a particular television show constitutes the information included in a televised advertisement. When the ad is viewed, the viewer can press the SAVE button and send the sequences to the VCR Plus using IR transmitter 235. While the portability of capture device 110 is advantageous, it is to be noted that in some arrangements, the functions of capture device 110 and telephone base 109 may be combined in a single stationary unit, which might resemble a cordless telephone base station. In this event, the functionality of capture device 110 would be included in the stationary unit, and that unit would be arranged, in the manner previously described, to collect information. In this arrangement, the stationary unit could also be adapted to utilize input devices such as optical character recognition (OCR) or scanners that would provide an additional method of inputting telephone numbers and coupon and/or product information. The hand piece of this stationary unit would be used to place a call and send the data.

The present invention is not limited to live televised programs, but can also be operated in conjunction with stored video programs played from a VCR. In this arrangement, advertisements and other encoded information in included in videos at the time they are recorded or at the time they are mastered and put onto video cassettes. A viewer watching a video with such an ad can respond immediately to reserve another video, purchase one of the items advertised, or order catalogs automatically. When a program containing subliminally encoded data is viewed, the viewer simply presses the DIAL button, launching a telephone call, and then presses the SEND DATA button, sending captured data, such as product information, to an agent, who can verify the order using the additional information that was captured or stored in the device.

The portability of the present invention can be used to advantage in implementing what can, in effect, be called a "Roaming Bulletin Board". A user can be attending a conference or traveling through the airport where kiosks or bulletin boards are set up. In the case of a conference, an attendee would walk through the conference viewing the displays. When the attendee sees a display of interest, he or she points the capture device towards the display, and captures the non-discernible encoded data from either the displayed image or the sound output. Later, the user launches a telephone call to the telephone number specified and included in the captured data, and sends out coupon information that is also part of the captured data.

It is further to be noted that the present invention can be used in the context of automobiles and mobile telephones. When a capture device in accordance with the invention is placed in a car, it can receive and capture non-discernible encoded data contained in the audio output of the car radio. The captured data can include a toll free or conventional telephone number for originating a mobile cellular telephone call from the car. The call may be placed to an interactive service platform, and additional captured data, such as coupon or similar information, can then be used to effectuate a transaction.

Various modification and adaptations of the present invention will be apparent to those skilled in the art. For example, the functions provided by the present invention may be combined with those used in a personal digital assistant (PDA) or a laptop computer. If desired, a simultaneous voice and data (SVD) modem of the type available now from AT&T could be provided in capture device 110 to allow communication both by voice and data transfer, at the same time. Various functions can also be added to the processes and applications described. For example, telephone base 109 may be programmed to dial a number of series of numbers at specific times, when certain amounts of information or data have been collected, or based upon some criteria. Capture device 110 could then send collected information "in bulk" to interactive service platform 130. For this purpose, modem 246 could be used, so as to send the information more efficiently.

In accordance with the present invention, a wireless capture device can include an acoustic data receiver that attenuates any frequencies that would correspond to a human voice signal. By this invention, someone could not eavesdrop on a human conversation that occurs near an acoustic data link.

What has been described is merely illustrative of the present invention. Other applications to wireless telephones, computers or other communication systems other than the disclosed system are contemplated as being within the knowledge of one skilled in the art and may be utilized without departing from the spirit and scope of the present invention.

What is claimed is:

1. An acoustic data receiver comprising a microphone for receiving an audio signal having encoded data that is non-discernable by a listener and is transmitted as part of the audio signal,
   a filter, associated with the microphone, for removing a substantial portion of a human voice signal that may have been received within the microphone, and
   a signal receiver for receiving the filtered signal and performing work on the signal for further processing or data communication.

2. The acoustic data receiver according to claim 1 wherein said filter comprises an electrical filter located after the microphone for filtering out signal frequencies corresponding substantially to those of the human voice.

3. The acoustic data receiver according to claim 1 wherein said filter is a high pass filter that passes frequencies above about 6000 to 7000 Hertz, and said encoded data is part of a signal having a frequency above about 6000 to 7000 Hertz.

4. The acoustic data receiver according to claim 1 wherein said filter is a mechanical filter formed from an extensible tube having a diaphragm at one end, the microphone at the other end, and a stub in the middle.

5. The acoustic data receiver according to claim 4 wherein said mechanical filter is contained in a sound enclosure.

6. An apparatus for initiating a transaction comprising
   a capture device, including a microphone for receiving an audio signal having encoded transaction data that is non-discernable by a listener and is transmitted as part of the audio signal and for converting the audio signal into an electrical signal, a filter, associated with the microphone, for removing a substantial portion of a human voice signal that may have been received within the microphone, and a processor for receiving the filtered signal, and
   means associated with the capture device for originating a telephone call and transferring at least a portion of the transaction data to a desired destination for initiating a transaction.

7. An apparatus according to claim 6 wherein said filter comprises an electrical filter located after the microphone for filtering out signal frequencies corresponding substantially to those of the human voice.

8. An apparatus according to claim 6 wherein said filter is a high pass filter that passes frequencies above about 6000 to 7000 Hertz, and said encoded data is part of a signal having a frequency above about 6000 to 7000 Hertz.

9. An apparatus according to claim 6 wherein said filter is a mechanical filter formed from an extensible tube having a diaphragm at one end, the microphone at the other, and a stub in the middle.

10. An apparatus according to claim 9 wherein said mechanical filter is contained in a sound enclosure.

11. An apparatus according to claim 9 including a storage for storing the transaction data.

12. An apparatus according to claim 9 including a display for displaying at least a portion of the transaction data to a user.

13. An apparatus according to claim 9 wherein said transaction data includes dialing information for originating a telephone call.

14. An apparatus according to claim 9 wherein said transaction data includes descriptive information about an advertisement or solicitation that is associated with the audio signal.

15. An apparatus according to claim 9 wherein said capture device comprises a portable phone, and said means for originating a telephone call comprises a personal base station in which said processor and said telephone call originating means are contained, and said capture device includes means for transferring data from said wireless capture device to said personal base station.

16. An apparatus for initiating a transaction, comprising
a wireless capture device arranged for the wireless capture of data directly from an audio signal, said data including encoded transaction data that is non-discemable by a listener and used for initiating a transaction, a microphone for receiving an audio signal and converting the audio signal into an electrical signal, and a filter associated with the microphone for removing a substantial portion of a human voice signal that may have been received within the microphone,
a processor for receiving the filtered signal and retrieving the transaction data from the electrical signal, and
means associated with the capture device for originating a telephone call and transferring at least a portion of the transaction data to a desired destination for initiating a transaction.

17. An apparatus according to claim 16 wherein said filter comprises an electrical filter located after the microphone for filtering out the frequencies corresponding substantially to those of the human voice.

18. An apparatus according to claim 16 wherein said filter is a high pass filter that passes frequencies above about 6000 to 7000 Hertz, and said encoded data is part of a signal having a frequency above about 6000 to 7000 Hertz.

19. An apparatus according to claim 16 wherein said filter is a mechanical filter formed from an extensible tube having a diaphragm at one end, the microphone at the other, and a stub in the middle.

20. An apparatus according to claim 19 wherein said mechanical filter is contained in a sound enclosure.

21. An apparatus according to claim 16 including a storage for storing for the transaction data.

22. An apparatus according to claim 16 including a display for displaying at least a portion of the transaction data to a user.

23. An apparatus according to claim 16 wherein said transaction data includes dialing information for originating a telephone call.

24. An apparatus according to claim 16 wherein said transaction data includes descriptive information about an advertisement or solicitation that is associated with the audio signal.

25. An apparatus according to claim 16 wherein said capture device comprises a portable phone, and said means for originating a telephone call comprises a personal base station in which said processor and said telephone call originating means are contained, said capture device including means for transferring data from the wireless capture device to said personal base station.

26. A method for receiving acoustic data comprising the steps of
receiving an audio signal within a microphone, wherein the audio signal has encoded data that is non-discernable by a listener and is transmitted as part of the audio signal,
removing a substantial portion of a human voice signal that may have been received within the microphone by filtering the frequencies substantially associated with the human voice,
converting the audio signal into an electrical signal, and
receiving the electrical signal and performing work on the signal for further processing or data communication.

27. The method according to claim 26 including the step of receiving the acoustic data signal within a mechanical filter that is formed from an extensible tube having a diaphragm at one end, the microphone at the other end, and a stub in the middle.

28. The method according to claim 27 including the step of changing the length of the tube in order to change the frequencies that are passed into the microphone.

29. The method according to claim 26 including the step of receiving the converted electrical signal from the microphone into an electrical filter.

30. A method for initiating a transaction comprising the steps of
receiving an audio signal within a microphone of a capture device, wherein the audio signal has encoded transaction data that is non-discernable to a listener and is transmitted as part of the audio signal,
removing a substantial portion of a human voice signal that may have been received within the microphone by filtering the frequencies substantially associated with the human voice,
converting the audio signal into an electrical signal,
processing the electrical signal to retrieve transaction data that is part of the audio signal, and
originating a telephone call and transferring at least a portion of the transaction data to a desired destination for initiating a transaction.

31. The method according to claim 30 including the step of receiving the acoustic data signal within a mechanical filter that is formed from an extensible tube having a diaphragm at one end, the microphone at the other end, and a stub in the middle.

32. The method according to claim 31 including the step of changing the length of the tube in order to change the frequencies that are passed into the microphone.

33. The method according to claim 30 including the step of displaying at least a portion of the transaction data to a user.

34. The method according to claim 30 including the step of dialing a telephone number from dialing information that was obtained from transaction data.

35. The method according to claim 30 wherein the transaction data includes descriptive information about an advertisement or solicitation that is associated with the audio signal.

36. The method according to claim 30 wherein the capture device comprises a portable phone, and the telephone call is originated within a personal base station which interprets scanned marks, and including the step of transferring the data from the wireless capture device to the personal base station.

37. The method according to claim 30 including the step of receiving the converted electrical signal from the microphone into an electrical filter.

* * * * *